US008090159B2

(12) United States Patent  
Gabara

(10) Patent No.: US 8,090,159 B2
(45) Date of Patent: *Jan. 3, 2012

(54) APPARATUS AND METHOD FOR IDENTIFYING A NAME CORRESPONDING TO A FACE OR VOICE USING A DATABASE

(75) Inventor: Constance Marie Gabara, Murray Hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/781,640

(22) Filed: May 17, 2010

(65) Prior Publication Data

US 2010/0219936 A1 Sep. 2, 2010

Related U.S. Application Data

(63) Continuation of application No. 11/559,700, filed on Nov. 14, 2006, now Pat. No. 7,751,597.

(51) Int. Cl.
G06K 9/00 (2006.01)
(52) U.S. Cl. ........ 382/116; 382/115; 382/118; 340/5.83
(58) Field of Classification Search .................. 382/116, 382/118, 115
See application file for complete search history.

(56) References Cited

U.S. PATENT DOCUMENTS

| 5,835,616 | A | 11/1998 | Lobo |
| 5,842,194 | A | 11/1998 | Arbuckle |
| 5,991,429 | A | 11/1999 | Coffin |
| 6,038,333 | A | 3/2000 | Wang |
| 6,349,898 | B1 | 2/2002 | Leonard |
| 6,799,163 | B2 | 9/2004 | Nolan |
| 7,113,089 | B2 | 9/2006 | Ho |
| 7,382,405 | B2 | 6/2008 | Kusaka |
| 7,634,662 | B2 * | 12/2009 | Monroe ........................ 713/186 |
| 2003/0189646 | A1 | 10/2003 | Bean |
| 2004/0086157 | A1 | 5/2004 | Sukegawa |
| 2004/0151347 | A1 | 8/2004 | Wisniewski |
| 2004/0174434 | A1 | 9/2004 | Walker |
| 2006/0009167 | A1 | 1/2006 | Meyer |
| 2006/0083440 | A1 | 4/2006 | Chen |

* cited by examiner

*Primary Examiner* — Samir Ahmed
*Assistant Examiner* — Ruiping Li
(74) *Attorney, Agent, or Firm* — Thaddeus Gabara

(57) ABSTRACT

The basic invention uses biometric signals to help identify the name of a family member, acquaintance or newly met individual. The biometric signals include facial and voice recognition. In addition, the invention can interactively produce the name of an individual met for the first time just after that individual shakes your hand and introduces themselves. Most people forget this name since they are concentrating on maintaining a conversation. An earphone plug can physically connect the handheld unit to the ear canal of the user and the identity of the individual is electronically passed over the wire to the user. A handheld unit identifies the individual and whispers their name into the ear canal. An earphone is physically connected to the handheld unit via a wire. This allows the identity of the individual to be electronically passed over the wire to the user. By touching the portable unit which is inserted into the ear canal, the name is whispered into the canal. All these identification procedures can be used to help eliminate an embarrassing moment which may occur if the user is unable to recall an individual's name.

20 Claims, 11 Drawing Sheets

APPARATUS AND METHOD FOR IDENTIFYING A NAME CORRESPONDING TO A FACE OR VOICE USING A DATABASE

CROSS-REFERENCE TO RELATED APPLICATIONS

This patent application is a continuation of Ser. No. 11/559,700, now U.S. Pat. No. 7,751,597 entitled "APPARATUS AND METHOD FOR IDENTIFYING A NAME CORRESPONDING TO A FACE OR VOICE USING A DATABASE," filed on Nov. 14, 2006, which is invented by the same inventor as the present application and incorporated herein by reference in their entireties. The present application is related, in part, to this parent's co-filed U.S. application of Ser. No. 11/559,687, now U.S. Pat. No. 7,986,230 entitled "APPARATUS AND METHOD FOR FINDING A MISPLACED OBJECT USING A DATABASE AND INSTRUCTIONS GENERATED BY A PORTABLE DEVICE" filed on Nov. 14, 2006, which is invented by the same inventor as the present application and incorporated herein by reference in their entireties.

BACKGROUND OF THE INVENTION

Failing to remember a relative at a family's yearly get together or a person's name after seeing them only once can be a common occurrence. At times, this can be an embarrassing moment, particularly, if the relative or acquaintance remembers your name the next time you meet. About all you can do is say "hello." In addition, it is also an unfortunate occurrence when you meet someone for the first time, get their name, and then fail to remember it during the remainder of the conversion.

Biometric analysis consists of identifying an individual (for the remainder of this application, an "individual" will be used to imply the word "target" due to the personal nature of the "target")—by analyzing a distinguishing element of the individual. Biometrics can include fingerprints, retinal analysis, DNA analysis, voice and facial features to name a few. Facial recognition and voice recognition are two examples of biometrics that has experienced widespread use.

Facial recognition is a well know and studied technique. It has been used by the Government, Banks and other institutions to search for and find criminals, terrorists, and wanted individuals. The success rate of identifying a criminal, terrorist, or wanted individual using a target database is currently fairly low. This occurs because the recognition device must be able to identify a single individual that is in the targeted database against potentially the population of the United States (300 Million people).

For instance, anyone entering the airports, train station and other forms of transportation is a sub-set of the 300 Million sample space. The targeted database may contain thousands of suspected terrorists, etc. The process of matching an individual to this database is a time consuming one—even with state of the art technology. Large mainframes are requires to perform the search. Because of this, these tools to identify an individual in the target database against the large sample space requires rooms filled with processors and memory storage elements. Furthermore, this database is tied to other locations in the country and the information is shared.

Several previous inventions address the problem of facial recognition. One, U.S. Pat. No. 5,835,616, issued Nov. 10, 1998 describes a two stage process for identifying a face in a digital image. A Second, U.S. Pat. No. 5,842,194, issued Nov. 24, 1998 describes a way of using fuzzy logic to identify faces. This can include a multi-step process. A third, U.S. Pat. No. 5,991,429, issued Nov. 23, 1999 describes a facial recognition system that can identify an individual even if they have on a disguise. All of the previous patents indicate that facial recognition is a well established procedure.

Several previous Pre-grant Publications also address the problem of biometric collection and comparison including facial recognition as well as some applications of facial recognition. One, Pub. No. U.S. 2004/0086157, published on May 6, 2004 describes a method of capturing biometric information (voice, for example) and comparing it to a registered information memory to help identify a person. A second one, Pub. No. U.S. 2004/0151347 published on Aug. 5, 2004 describes a facial recognition system that can be incorporated into dolls, games, anti-theft systems and drowsiness detection.

All of the previously mentioned patents and publications indicate that biometric techniques are well know. In addition, one PGPUG indicates several applications that can utilize the biometric technique to offer advantages to potential products.

One aspect missing from the applications is using biometric data to identify an individual to prevent an embarrassing moment of not being able to recall their name. This invention shows how the embarrassing moment can be overcome.

BRIEF SUMMARY OF THE INVENTION

The invention described in this application is used to identify the name of an individual without causing an embarrassing moment. This individual may be a relative, friend, or acquaintance. In addition, this invention can keep track of the name of an individual that the user met for the first time. Thus, the user can address the individual during the active part of the conversation.

Biometrics can be used to identify an individual without their knowledge that the identification process is occurring. Two examples of biometric are facial recognition and voice recognition. The invention uses a camera or a voice recording mechanism to obtain an image or sound template from the individual. These two techniques are non-evasive and can be performed in a portable handheld unit.

The handheld unit then stores the association of the face and voice print to a name entered by the user or perceived by the handheld unit. This association can be used at a later date to identity an individual. The database compares the current unknown individual with the contents of the target database which was stored at an earlier date and retrieves an association between the current individual and the stored individual.

The result of the analysis can be shown to the user of the portable unit on the screen of an LCD or Bluetooth or comparable wireless local interconnect (i.e., UWB) can be used to send the result to a wireless hearing aid inserted into the ear. The name of the individual is whispered into the ear canal. Both of these methods attempt to be non-evasive to the individual stored in the database so they are not aware that the identifying process is occurring.

The basic invention allows the user to introduce individuals that are familiar to the user into the portable unit. As the user meets additional friends, relatives, etc., the faces, voices and corresponding names are entered into the database and stored for future comparison. This does not require such a large sample space or a large target database; thus, reducing the complexity of the recognition process. With the prevalence of portable handheld units and the increase in computational ability, this reduction in complexity of the recognition process can be implemented into a portable handheld unit.

If the sample space contents can be significantly reduced in count and the expected number of faces to be recognized is on the same order in size as the sample space, the ability to recognize an individual can be further reduced in complexity.

In addition, since the sample space and the target database are similar in size and are determined by the user of the portable unit, the complexity is further reduced. Such a tool would be useful to identify the identity of relatives, friends and colleagues (100's) where the sample space is orders of magnitude less then the 300 Million large sample space mentioned earlier.

A second embodiment of the invention can identify a target individual using a voice sample. Note that a voice identification recognition method can be substituted in place of the visual image of the face. The voice of the individual can be stored and compared against the current voice stored in the target database.

A third embodiment of the invention can comprehend the speech of the user to identify their name as the individual pronounces it. This name is translated into either a textual or an audio signal to be intercepted by the user to help remember the identity of the individual.

All these techniques being used to identify the individual are non-evasive; that is, the individual being targeted does not necessary know that they are being identified. Thus, the embarrassing moment of failing to remember the name of an individual can potentially be eliminated.

DETAILED DESCRIPTION OF THE INVENTION

Figure 1A:
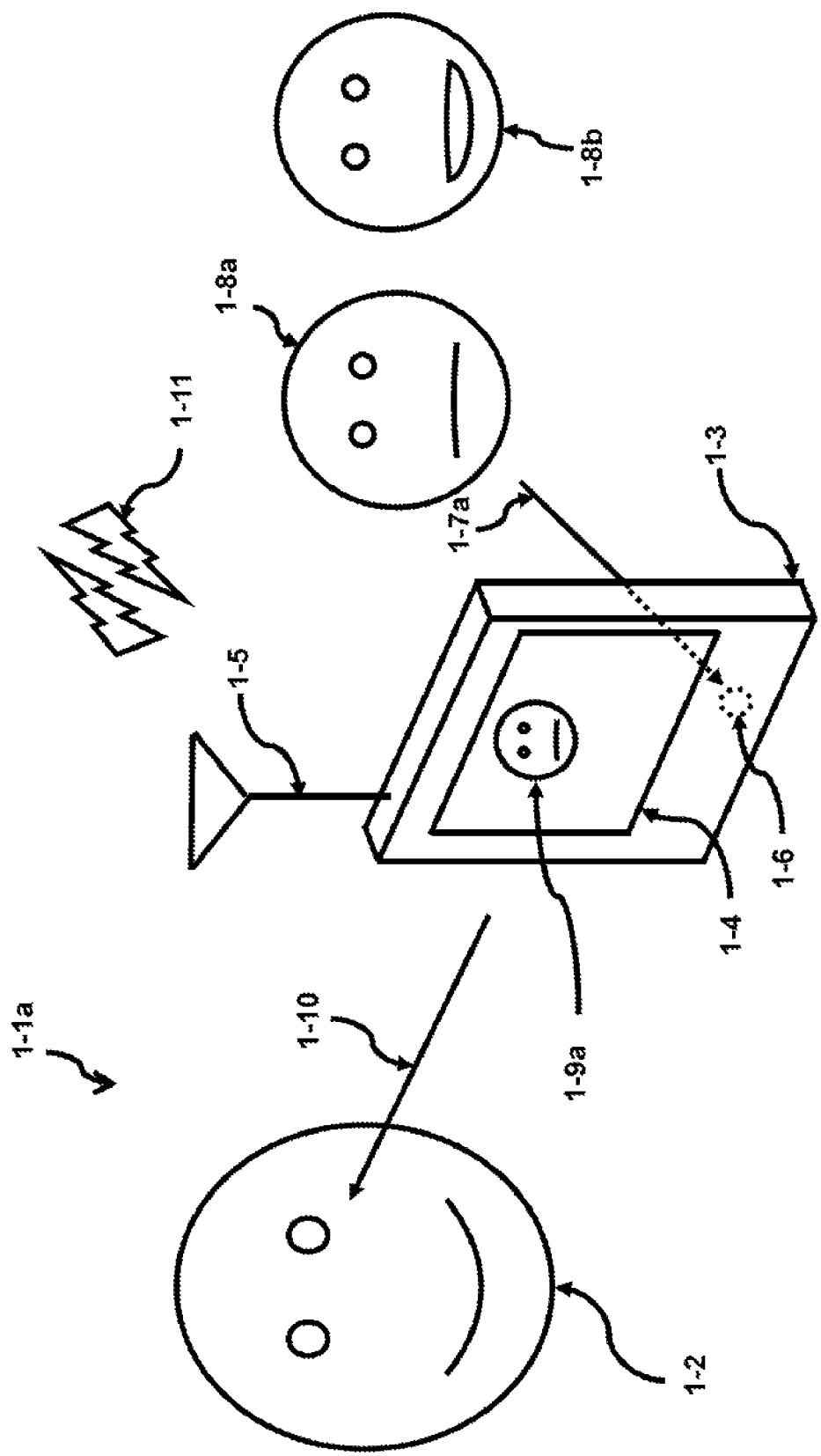
FIG. 1a illustrates a prior art apparatus displaying an image on the display screen of a portable unit.

A prior art view 1-1a of a user 1-2 viewing a portable unit 1-3 to display an image 1-9a on the display screen 1-4 is provided in FIG. 1a. The portable unit 1-3 also contains at least one antenna 1-5 and a database (not shown). The wireless signal 1-11 can be used to connect to a second external database to obtain additional information. The portable unit 1-3 also contains a camera 1-6. This portable unit 1-3 can be a cell phone, a PDA device, or any device that contains a display component, antenna and a camera. The display screen 1-4 can be an LCD, TFT, or any comparable display.

An image propagation path 1-7a of a first individual 1-8a is sensed by the camera 1-6. The image 1-9a is displayed on the display screen 1-4 to the user 1-2. The captured image propagation path 1-10 is sensed by the user 1-2.

Figure 1B:
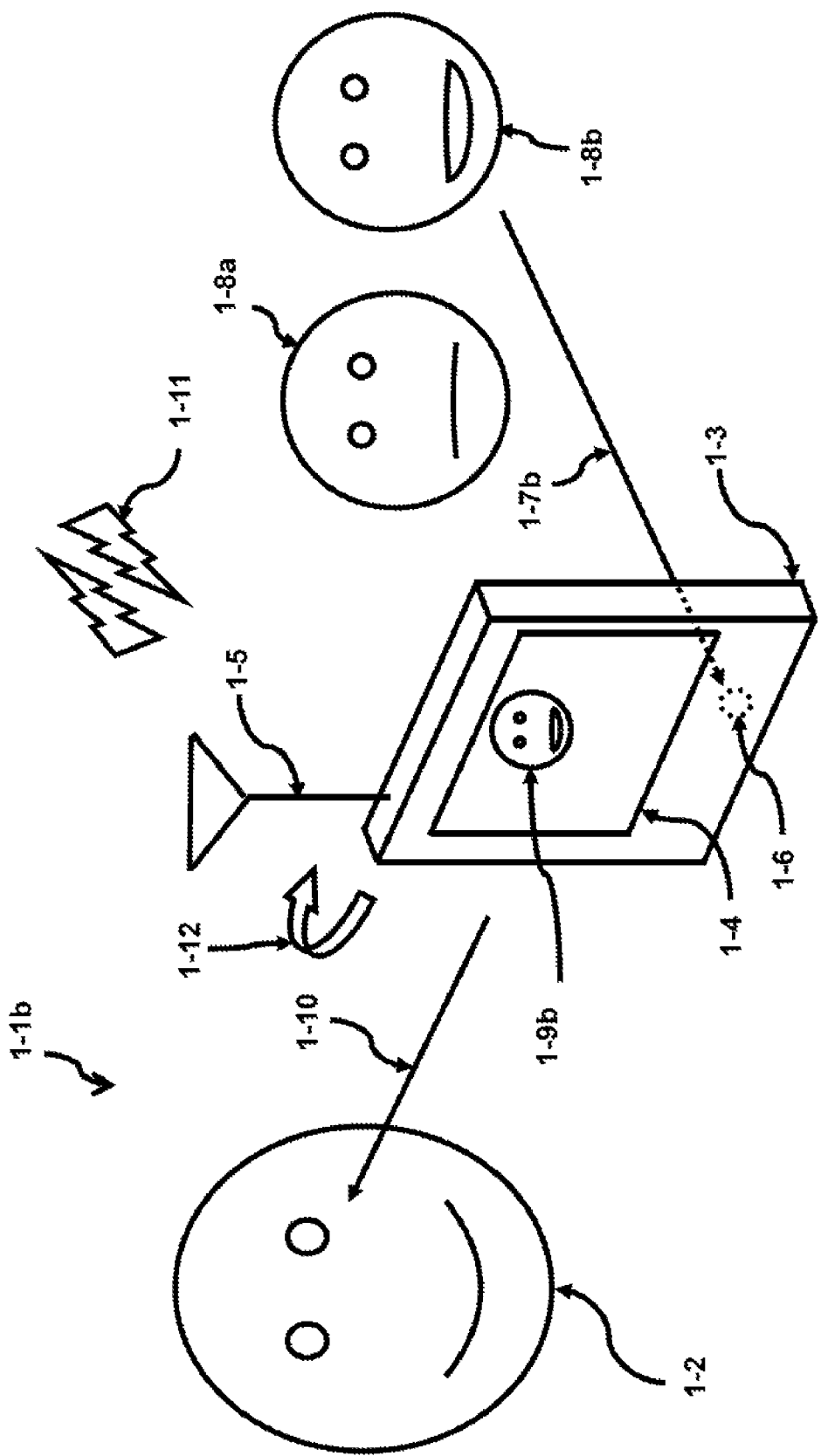
FIG. 1b depicts a prior art apparatus displaying a second image on the display screen of a portable unit after rotation.

All of the components identified with the same numeric throughout these drawings corresponds effectively to the same component or item. For example, in FIG. 1b another prior art drawing 1-1b is illustrated. The portable unit 1-3 is rotated 1-12 to capture the image of a second individual 1-8b. An image propagation path 1-7b of a second individual 1-8b is sensed by the camera 1-6. The image 1-9b is displayed on the display screen 1-4 to the user 1-2. The captured image propagation path 1-10 is sensed by the user 1-2.

Figure 2A:
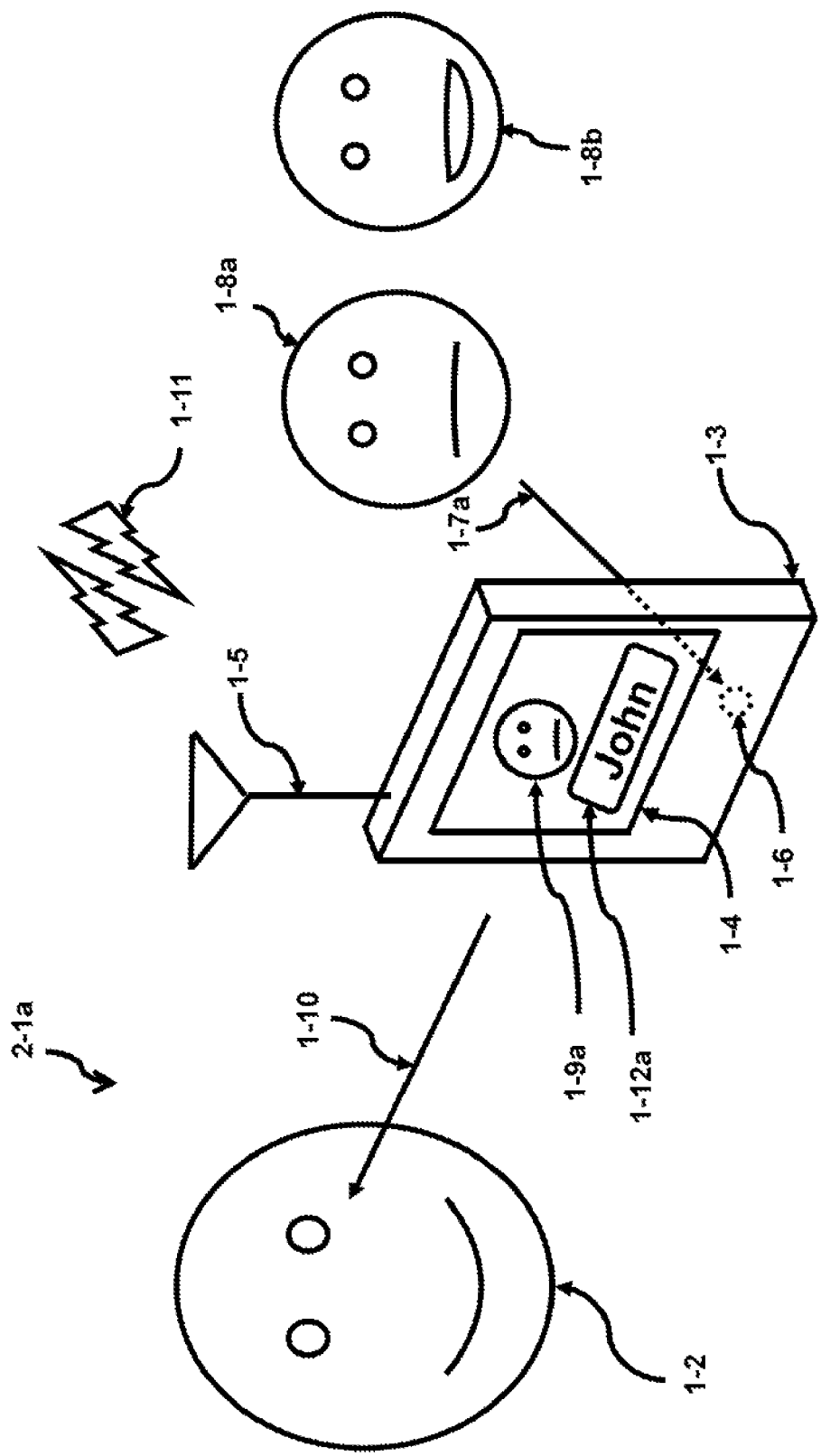
FIG. 2a illustrates an apparatus displaying an image and a name on the display screen of a portable unit in accordance with the present invention.

FIG. 2a illustrates a first version 2-1a of the invention. This illustration is very similar to that given in FIG. 1a except that the individual 1-8a has been identified with a name 1-12a. Now the user 1-2 can read the name and address the individual 1-8a as John.

Figure 2B:
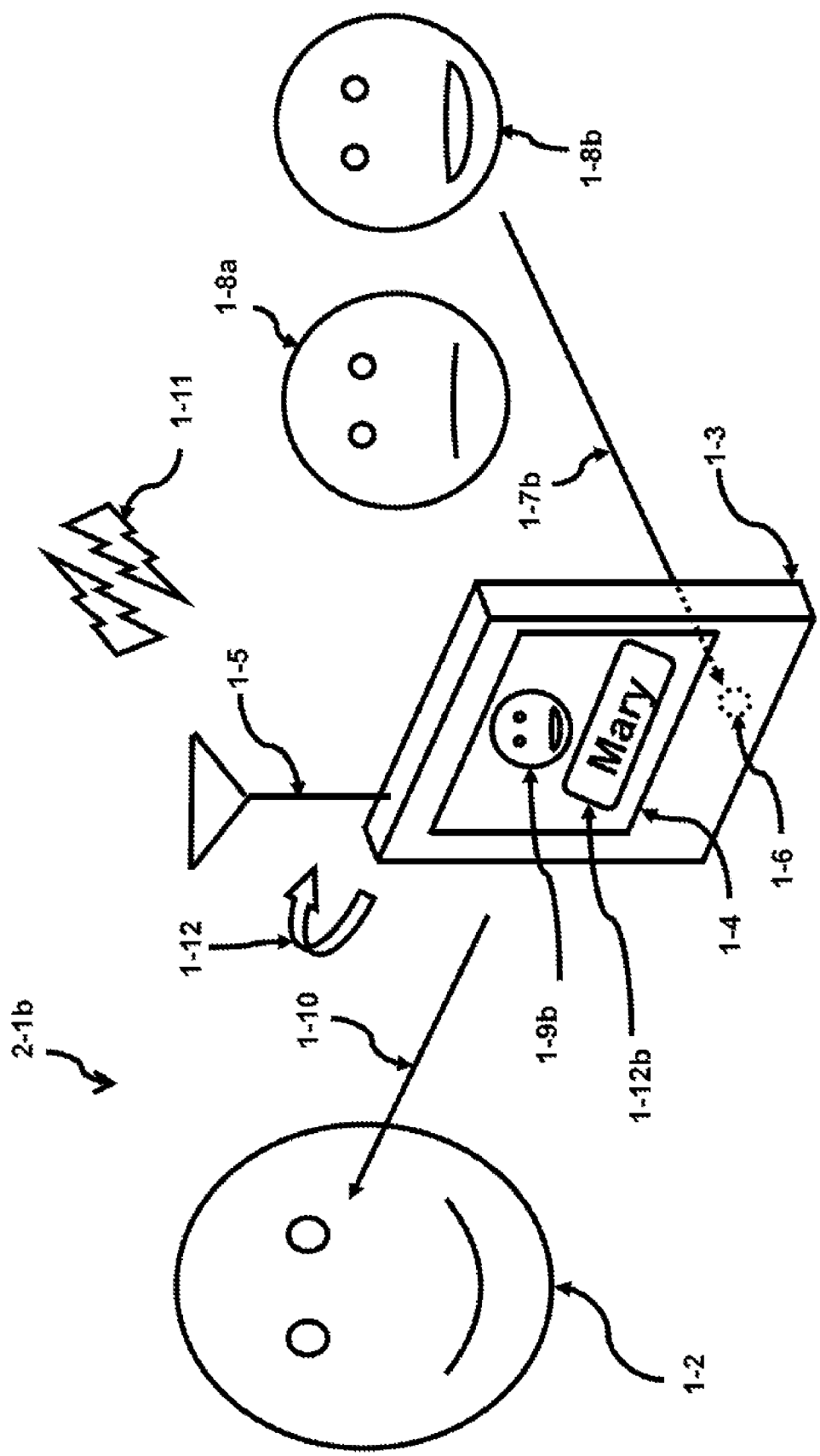
FIG. 2b depicts an apparatus displaying an image and a name on the display screen of a portable unit after rotation in accordance with the present invention.

FIG. 2b illustrates a drawing 2-1b showing a rotation 1-12 applied to the device 2-1b of the invention. This illustration is very similar to that given in FIG. 1b except that the individual 1-8b has been identified with a name 1-12b. Now the user 1-2 can read the name and address the individual 1-8b as Mary. Of course, additional information can be displayed about the individual such as; the number of children they have, their residence location, hobbies, phone number, etc.

Figure 3A:
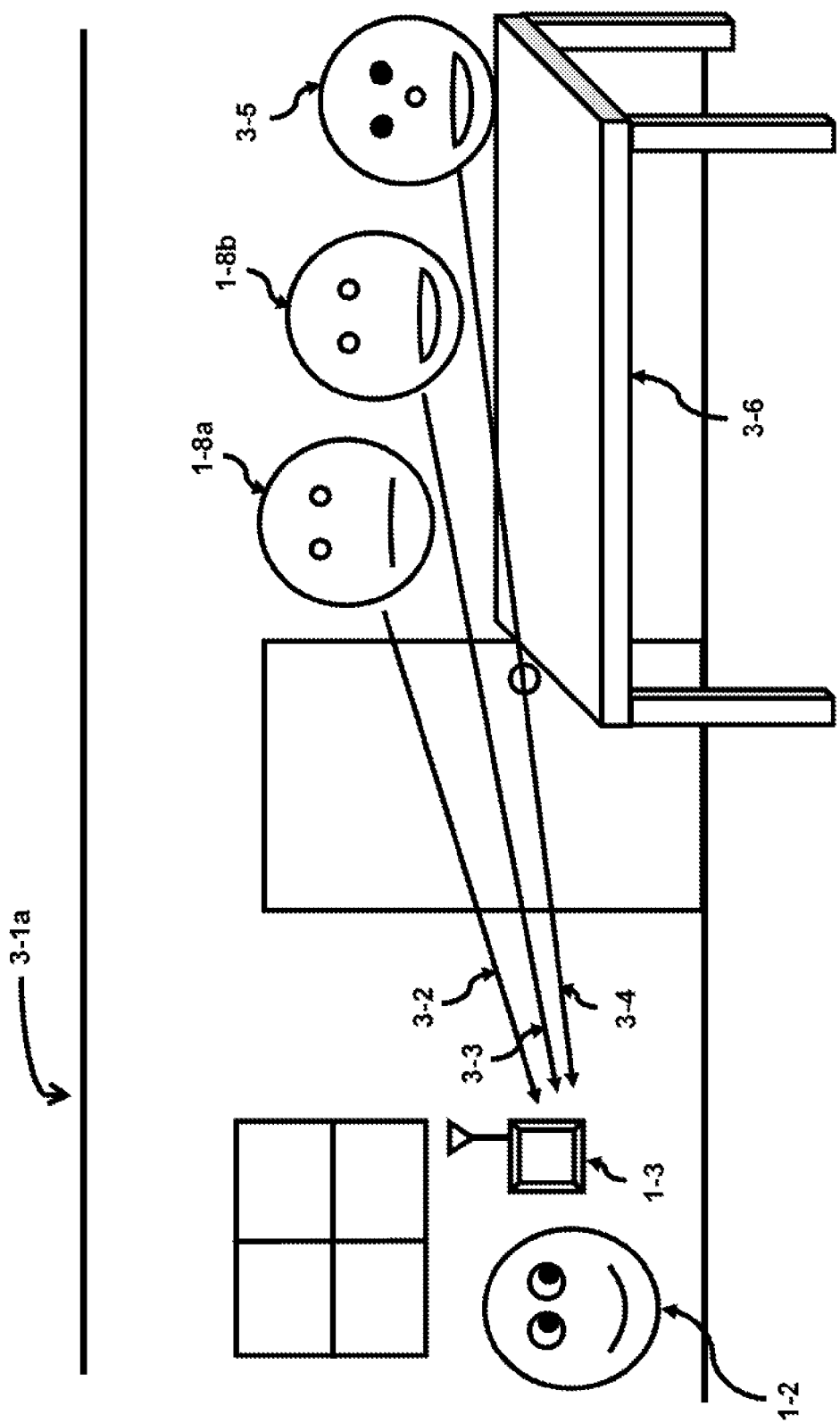
FIG. 3a shows an individual in a room using the inventive device in accordance with the present invention.

View 3-1a of FIG. 3a illustrates the user 1-2 in a room with three individuals 1-8a, 1-8b and 3-5. The image propagation path 3-2 of the first individual 1-8a is shown. In addition, the image propagation path 3-3 of the second individual 1-8b and the image propagation path 3-3 of the third individual 3-5 are also depicted. The three individuals are sitting at the table 3-6. All of the image propagation paths fall on the camera 1-6 (not shown) of the portable unit 1-3. All individuals have been identified.

Figure 3B:
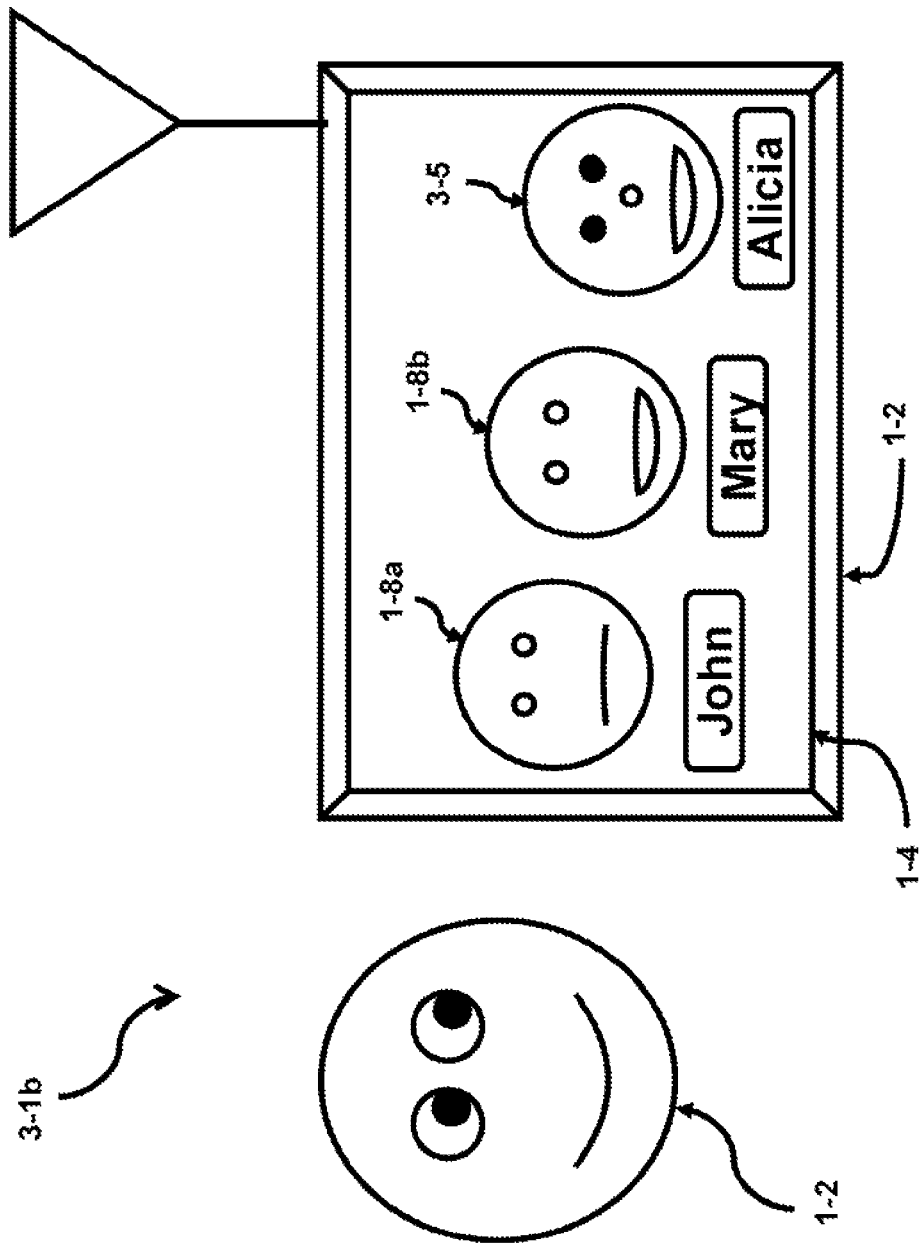
FIG. 3b illustrates the facial images on the screen of the inventive device in accordance with the present invention.

View 3-1b of FIG. 3b illustrates the three individuals and their names being displayed on the display screen 1-4. Each individual 1-8a, 1-8b and 3-5 are named John, Mary and Alicia, respectively.

Figure 4:
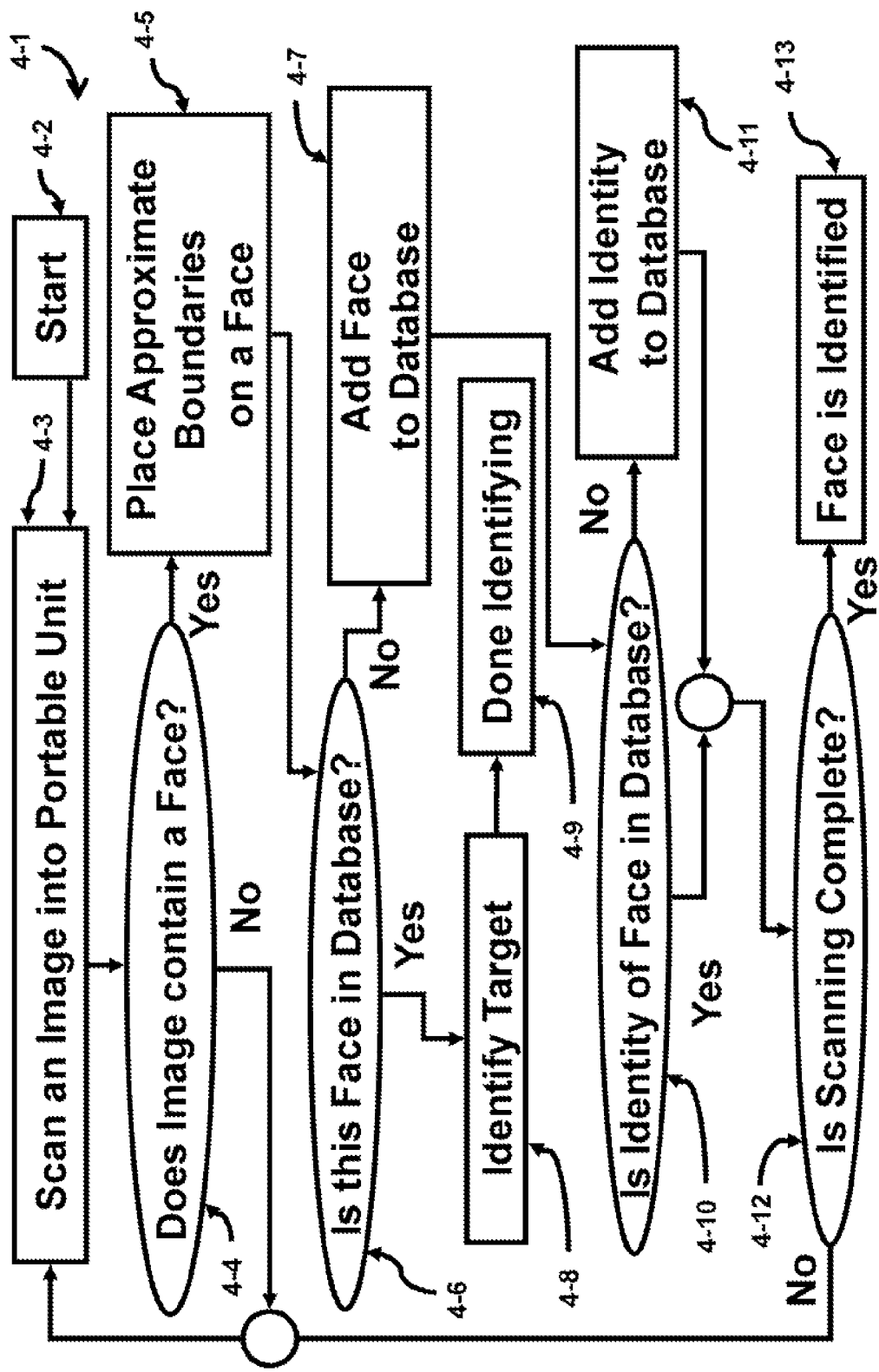
FIG. 4 depicts a flowchart of storing or identifying facial images in accordance with the present invention.

FIG. 4 depicts a flowchart 4-1 that explains how the image of a face is identified. The start block 4-2 moves to the 4-3 block where an image is scanned into the portable unit. Then decision block 4-4 questions "if the image contains a face?" Facial recognition (not shown) is embedded inside the portable unit to identify a face. If the answer is NO then return to block 4-3 to repeat the scan. If the answer is YES then move into block 4-5.

Block 4-5 places boundaries on the face and passes control to decision block 4-6. If the face is in the database, then block 4-8 requests to identify the individual and the identification of the face is complete as indicated in block 4-9.

Otherwise, if the face is not in the database, then block 4-7 requests to add the face and information into the database and move to decision block 4-10. If the decision block determines that the face is already in the database then this image has been captured at an earlier date and control moves to the decision block 4-12. Otherwise, the flow moves to block 4-11 which indicates that the face and identity should be added to the database. Once scanning is complete 4-12, the control moves to block 4-13 and the flowchart 4-1 is terminated.

Figure 5A:
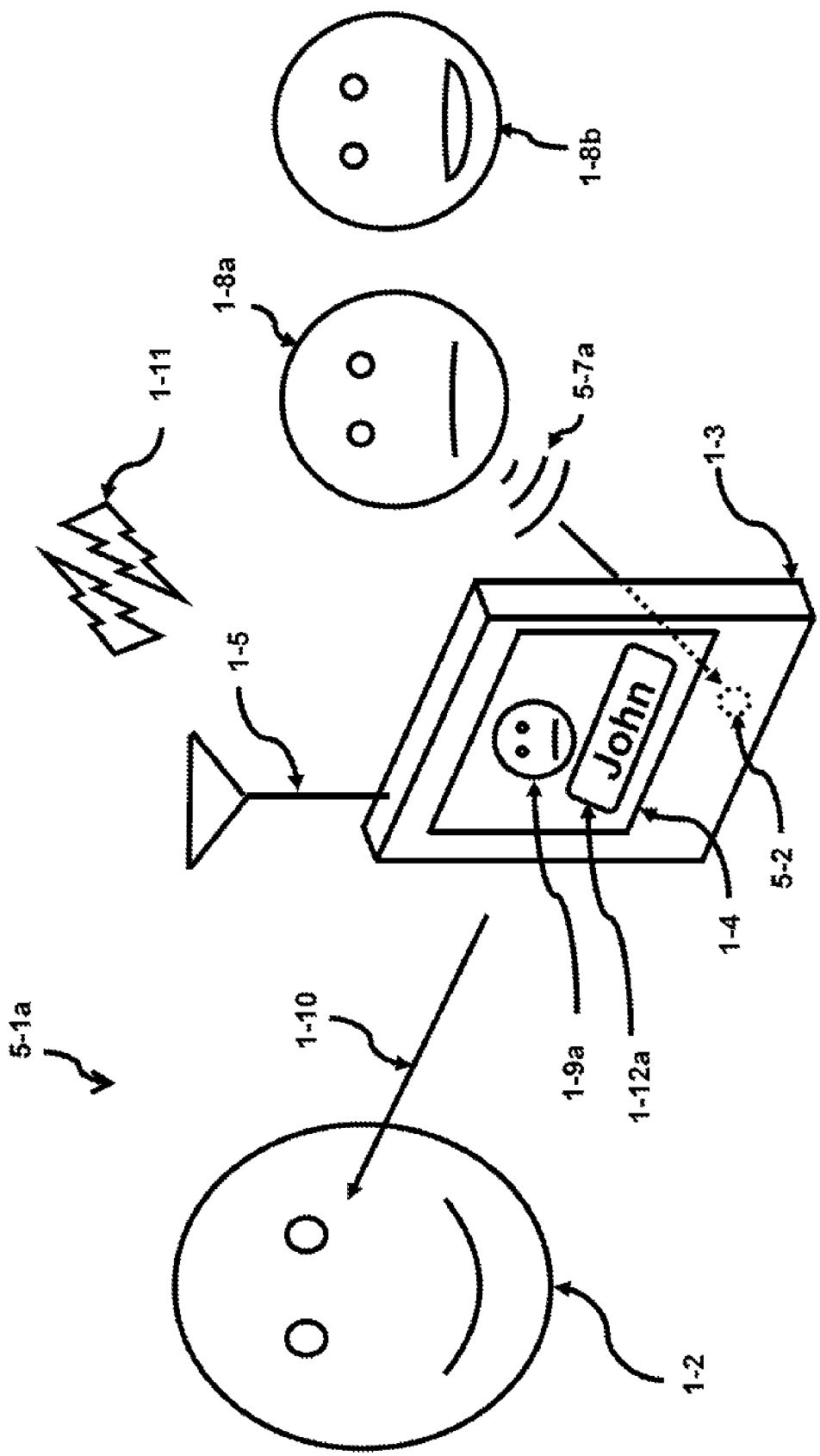
FIG. 5a depicts the portable unit identifying the voice of an individual made in accordance with the present invention.

FIG. 5a illustrates a system 5-1a to identify an individual 1-8a using the voice 5-7a of the individual. The portable unit 1-3 contains a microphone 5-2 to capture the voice 5-7a. The voice 5-7a is analyzed and the identity 1-12a is displayed on the screen 1-4. User 1-2 sees the name 1-12a and the user 1-2 can address the first individual 1-8a as John.

Figure 5B:
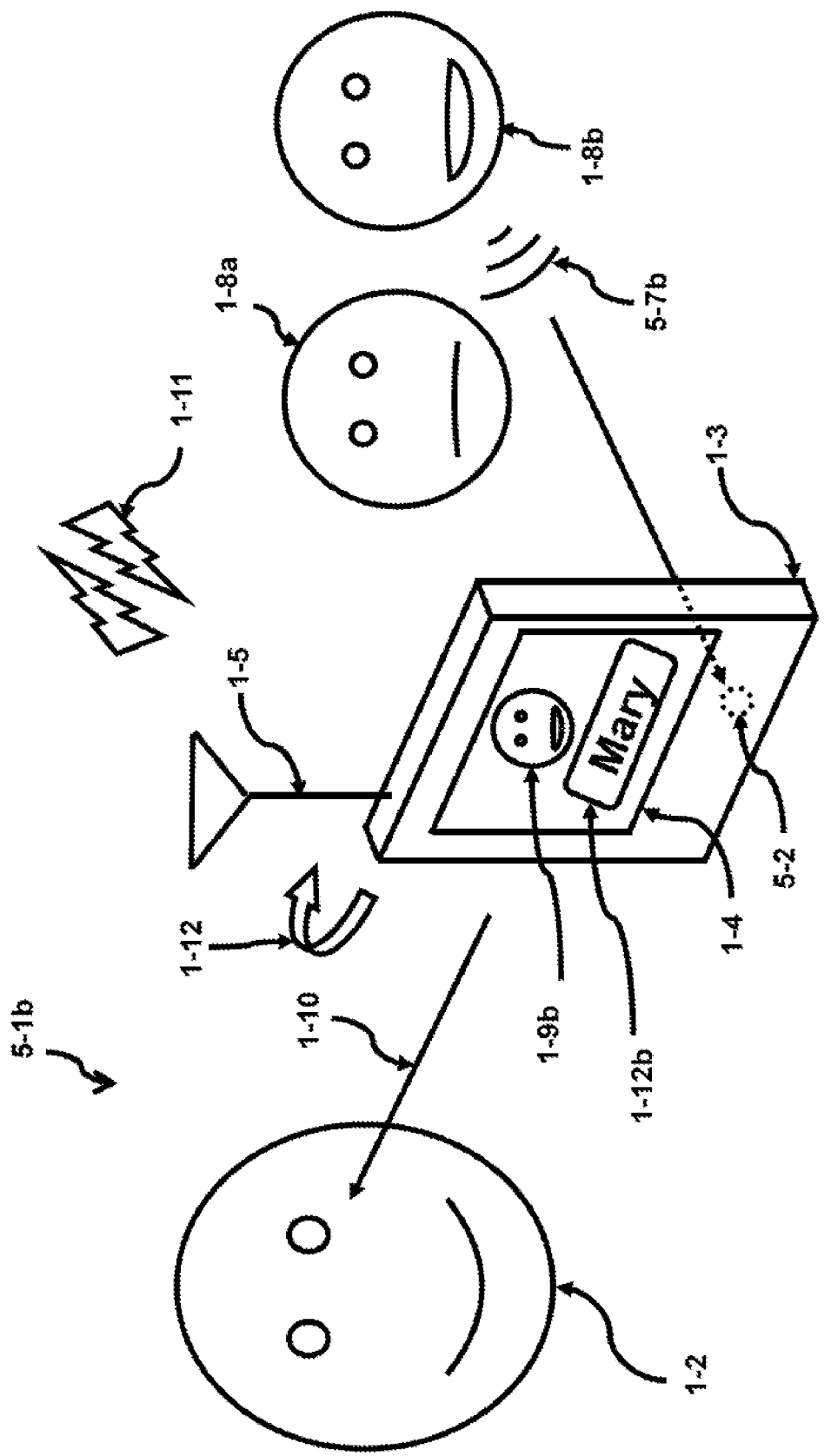
FIG. 5b shows the portable unit identifying the voice of a second individual made in accordance with the present invention.

FIG. 5b illustrates a system 5-1b to identify a individual 1-8b after rotating the device 1-3 to better capture the voice 5-7b of the individual 1-8b. The portable unit 1-3 contains a microphone 5-2 to capture the voice 5-7b. The voice 5-7b is analyzed and the identity 1-12b is displayed on the screen 1-4. User 1-2 sees the name 1-12b and the user 1-2 can address the second individual 1-8b as Mary.

Figure 6:
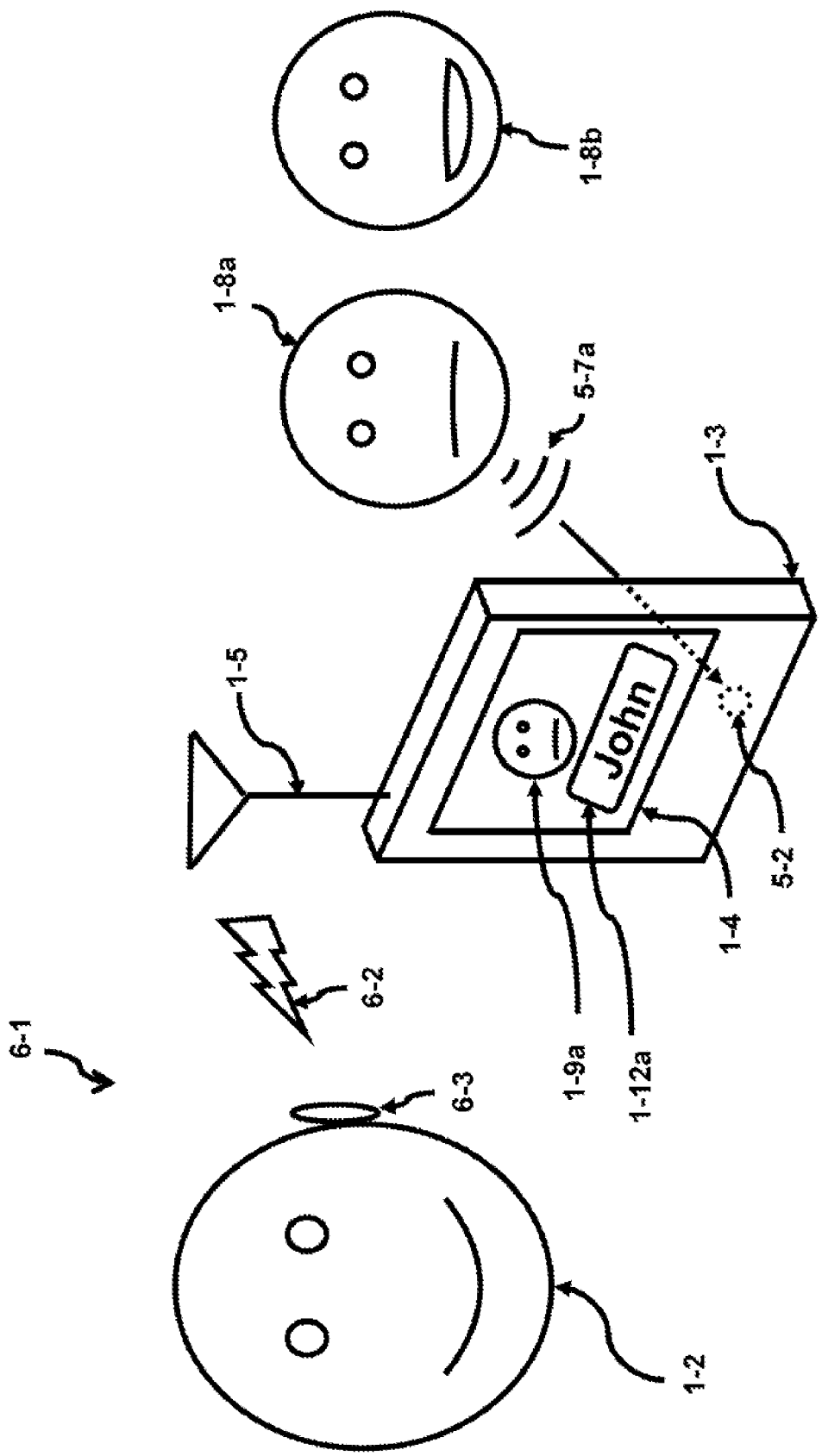
FIG. 6 depicts the portable unit identifying the voice of a individual and sending the name to a second wireless unit inserted in the ear canal made in accordance with the present invention.

FIG. 6 illustrates a system 6-1 to identify a individual 1-8a. The portable unit 1-3 contains a microphone 5-2 to capture the voice 5-7a. The voice 5-7a is analyzed and the identity 1-12a is displayed on the screen 1-4. User 1-2 sees the name 1-12a on the display 1-4. In addition, the name of the identity of 1-8a is applied to the antenna 1-5 and sent as a wireless signal 6-2 to the user 1-2.

A wireless receiver 6-3 intercepts the signal 6-2 and introduces the name into the ear canal in a whispered format after the user 1-2 touches the receiver 6-3. Thus, the individual 1-8a can not hear his name being generated by the wireless unit 6-3. The wireless transmission 6-2 can follows the protocol short range transmissions such as UWB, Bluetooth, etc.

The user does not necessarily have to see the image 1-9a of the individual 1-8a on the display screen 1-4 to identify the individual 1-8a. It helps to reinforce the identification, but an audio signal may be sufficient to identify the individual and the display 1-4 can be eliminated. Thus, due to miniaturization of the device, the unit 6-3 can contain a microphone 5-2, the database, the algorithm for identification, an RF receiver and tiny speaker element (not shown). The entire unit can be inserted into the ear canal and as the individuals 5-7a and 5-7b speak, their identities are whispered into the ear canal.

Figure 7:
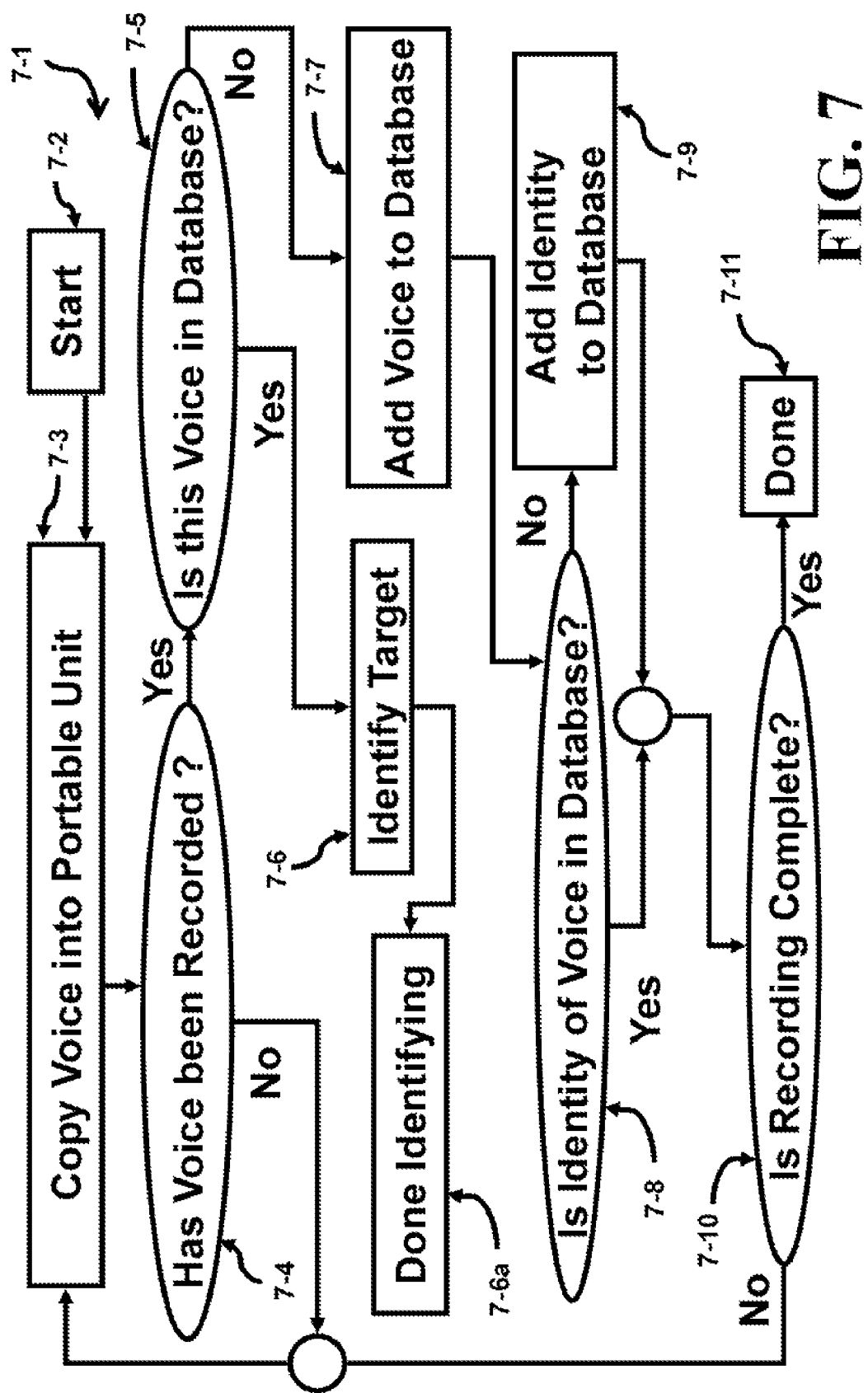
FIG. 7 illustrates a flowchart for voice identification made in accordance with the present invention.

FIG. 7 depicts a flowchart 7-1 that explains how a voice signal can be identified. The start block 7-2 moves to the 7-3 block where an audio of the voice is scanned into the portable unit. Then decision block 7-4 questions "has voice been recorded?" Voice recognition (not shown) is embedded inside the portable unit to identify the ownership of a voice. If the answer is NO then return to block 7-3 to repeat the recording. If the answer is YES then move into decision block 7-5.

Decision block 7-5 searches to see if the voice is in the database. If the voice is in the database, then block 7-6 requests to identify the individual and in block 7-6a the identification of the voice is complete.

Otherwise, if the voice is not in the database, then block 7-7 requests to add the voice and information into the database and move to decision block 7-8. If the decision block determines that the voice is already in the database then this voice has been captured at an earlier date and control moves to the decision block 7-10. Otherwise, the flow moves to block 7-9 which indicates that the voice and identity should be added to the database. Once recording is complete 7-10, the control moves to block 7-11 and the flowchart 7-1 is terminated.

Finally, it is understood that the above descriptions are only illustrative of the principles of the current invention. In accordance with these principles, those skilled in the art may devise numerous modifications without departing from the spirit and scope of the invention. For example, entry of the database information can be via; a keyboard (not shown), the user's voice, mouse control, etc. Although a single antenna 1-5 is illustrated and is external, there may be several antennae and they can be internal to the handheld unit 1-3. The handheld unit 1-3 can be a cell phone, PDA, a version of a camera, etc. The handheld unit 1-3 may contain both a camera 1-6 and a microphone 5-2, such that both or either one can be used for identification. An earphone plug can physically connect the handheld unit 1-3 to the ear canal of the user. And the identity of the individual is electronically passed over the wire to the user 1-2. Finally, the invention can be reduced in size by removing the display area 1-4 and camera and placed in the ear canal to provide to the user 1-2 an interactive way to remember the name of individual just met at a meeting to prevent an embarrassing moment.

The invention claimed is:

1. A portable device apparatus comprising:
   at least one component that can capture biometrics of an individual,
   a database storing the biometrics as data;
   wherein the biometrics can be a facial image or a voice print;
   a recognition unit that compares the captured biometrics to a contents held by the database; and
   a positive comparison provides an identity of the individual to a user; whereby
   the identity of the individual can be electronically passed over a wire physically connected to an earphone that audibly introduces the identity of the individual into an ear canal of the user to avoid an embarrassing moment between the user and the individual.

2. The apparatus of claim 1, wherein
   the identity of the individual can be secretly transferred to the user.

3. The apparatus of claim 1, wherein
   the identity of the individual can be displayed on a display screen.

4. The apparatus of claim 1, wherein
   the portable device can fit in the ear canal.

5. The apparatus of claim 1, further comprising:
   a wireless interface to access additional external databases.

6. The apparatus of claim 1, further comprising:
   the portable device can fit in a pair of glasses.

7. A method of identifying a face in a database using a portable device comprising the steps of:
   scanning an image into a camera;
   finding the face in the image;
   placing approximate boundaries around the face;
   using a recognition unit to compare the face to a contents held by the database;
   storing the face in the image into the database if needed;
   marking the face with an identity; and
   identifying the face in the database; such that
   the identity of the individual can be electronically passed over a wire physically connected to an earphone that audibly introduces into an ear canal of the user the identity of the individual.

8. The method of claim 7, further comprising:
   extracting the face from the database in a later comparison to provide the user with the identity of the face.

9. The method of claim 7, wherein
   the identity of the face can be secretly transferred to the user.

10. The method of claim 9, wherein
    an embarrassing moment between the user and the individual can be avoided.

11. The method of claim 7, wherein
    the identity of the individual can be displayed on a display screen.

12. A method of storing voices using a portable device comprising the steps of:
    recording at least one voice into the device;
    marking the voice with an identity;
    storing the voice with the identity into a database if needed;
    recording a newer voice;

comparing the newer voice to a stored voice in the database; and providing a user the identity of an individual matching the newer voice; whereby the identity of the individual can be electronically passed over a wire physically connected to an earphone that audibly introduces into an ear canal of the user the identity of the individual.

13. The method of claim 12, further comprising:

secretly transferring the identity of the individual to the user.

14. The method of claim 13, wherein an embarrassing moment between the user and the individual can be avoided.

15. The method of claim 12, wherein the identity of the individual can be displayed on a display screen.

16. The method of claim 12, wherein the portable device can fit in the ear canal.

17. The method of claim 16, further comprising:

tapping the portable device so the identity of the individual can be audibly introduced into the ear canal of the user.

18. A method of identifying a voice in a database using a portable device comprising the steps of:

recording a voice into the portable device;

using a recognition unit to compare the voice to a contents held by the database;

marking the voice with an identity; and identifying the voice in the database; such that the identity of the voice can be electronically passed over a wire physically connected to an earphone that audibly introduces into an ear canal of the user the identity of the voice.

19. The method of claim 18, further comprising:

secretly transferring the identity of the voice of an individual to the user.

20. The method of claim 19, wherein an embarrassing moment between the user and the individual can be avoided.

* * * * *